United States Patent
Ahn et al.

(10) Patent No.: US 7,633,054 B2
(45) Date of Patent: Dec. 15, 2009

(54) RADIATION DETECTING SYSTEM USING SOLID-STATE SENSORS WITH ELECTRONIC COOLING AND METHOD OF PREVENTING CONDENSATION USING THE SAME

(75) Inventors: Young Buk Ahn, Kyungki Sungnamsi (KR); Kuee Young Yoon, Kyungi Yonginsi (KR); Jinhun Joung, Choongbook Chungjoosi (KR); Dae Sik Min, Seoul (KR); Jong Hee Lee, Seoul (KR); Jae Kuk Moon, Seoul (KR)

(73) Assignee: Osteosys, Inc. (KR)

( * ) Notice: Subject to any disclaimer, the term of this patent is extended or adjusted under 35 U.S.C. 154(b) by 0 days.

(21) Appl. No.: 12/142,374

(22) Filed: Jun. 19, 2008

(65) Prior Publication Data
US 2009/0261238 A1    Oct. 22, 2009

(30) Foreign Application Priority Data
Apr. 17, 2008    (KR) .................... 10-2008-0035690

(51) Int. Cl.
*H01J 7/24* (2006.01)
*H01J 40/14* (2006.01)

(52) U.S. Cl. ....................... 250/238; 250/239

(58) Field of Classification Search ................. 250/238, 250/239, 221, 222.1, 216, 352; 165/80.3, 165/80.4, 96, 185; 361/690, 699, 704
See application file for complete search history.

(56) References Cited

U.S. PATENT DOCUMENTS

2007/0278412 A1*    12/2007    Hackenschmied et al. ............... 250/363.08

FOREIGN PATENT DOCUMENTS

| KR | 1995-0002256 U | 3/1995 |
| KR | 1020020073955 A | 9/2002 |

* cited by examiner

*Primary Examiner*—Que T Le
*Assistant Examiner*—Don Williams
(74) *Attorney, Agent, or Firm*—Reinhart Boerner Van Deuren P.C.

(57) ABSTRACT

The invention provides a radiation detector that can efficiently cool solid-state sensors used in collecting photons produced during conversion of radiation to light. The radiation detector can achieve an excellent cooling effect by transferring heat, which is produced during the cooling process, through a housing. The radiation detector comprises of an detection unit that detects the photons produced during the conversion of radiation to light, by utilizing a plurality of solid-state sensors installed on the motherboard. The radiation detector further comprises a heat transferring unit that cools the plurality of solid-state sensors simultaneously.

11 Claims, 8 Drawing Sheets

RADIATION DETECTING SYSTEM USING SOLID-STATE SENSORS WITH ELECTRONIC COOLING AND METHOD OF PREVENTING CONDENSATION USING THE SAME

CROSS-REFERENCE TO RELATED PATENT APPLICATIONS

This patent application claims the benefit of Korean Patent Application No. 10-2008-0035690, filed Apr. 17, 2008, the entire teachings and disclosure of which are incorporated herein by reference thereto.

FIELD OF THE INVENTION

The present invention is related to a radiation detector that can effectively cool solid-state sensors and prevent condensation. More particularly, the radiation detector, wherein the solid-state sensors used in collecting photons produced during conversion of radiation to light are efficiently cooled, wherein heat produced during cooling of thermoelectric modules is transferred through a housing to provide an excellent condensation removal effect and cooling effect.

BACKGROUND OF THE INVENTION

A gamma ray detector is a detector used in nuclear medicine imaging equipment for early diagnosis of various diseases. It provides functional and biochemical images of human organs by detecting a gamma ray produced from a gamma ray source administered to patients.

Nuclear medicine equipments recently made a large contribution in the rapid development of molecular imaging area. These kinds of equipment are largely classified into Single Photon Emission Computerized Tomography (SPECT) using single photon and Positron Emission Tomography (PET) using two photons at the same time. As the detector technology evolved from PMT (photo multiplier tube) to semiconductor technology based solid-state methods, it provided many advantages such as improved quality of image, miniaturization of detector, and reduced installation space. However, it is particularly important to maintain a constant temperature of photoelectric sensors according to changing signal to noise ratio in the solid-state method, which are sensitive to temperature fluctuations. Further, some solid-state sensors can function normally at very low temperatures (−10° C. ~−20° C.).

Therefore, many cooling techniques have been suggested, but most of them have shown to be not practical in terms of their effectiveness nor economical. Moreover, moisture and condensation generated during cooling to a low temperature have become problematic for radiation detectors using such semiconductor methods.

BRIEF SUMMARY OF THE INVENTION

In one aspect, the invention provides a radiation detector having an excellent cooling effect comprising a detection unit comprising a plurality of solid-state sensors assembled on a motherboard to detect photons generated by conversion of a radiation irradiated from a radiation source into a light. The radiation detector further comprises a heat transferring unit, which is provided under the detection unit, to cool the plurality of solid-state sensors simultaneously; and a housing, wherein the detection unit and the heat transferring unit are provided.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

A radiation detector, according to the present invention, provides an excellent cooling effect, therefore improving a signal to noise ratio, by combining solid-state sensors, which are used to collect photons generated during conversion of radiation to light, through holes formed on a motherboard, such that the solid-state sensors are in direct contact with a plane structure of thermoelectric modules for efficient cooling. Further, the radiation detector can transfer heat generated at one side of the thermoelectric modules through a housing formed of aluminum having a high thermal conductivity to maintain an appropriate temperature required by a semiconductor apparatus. Further, the housing can remove moisture and condensation formed on the radiation detector, thereby extending the life-span and improving the stability of the semiconductor apparatus to provide economical advantages.

To achieve such efficient cooling effect, the radiation detector is provided in a housing. The radiation detector comprises a detection unit, which detects photons produced during conversion of radiation to light by utilizing a plurality of solid-state sensors installed on a motherboard. The radiation detector further comprises a heat transferring unit which is provided under the detection unit to cool the plurality of solid-state sensors simultaneously.

The heat transferring unit can comprise a heat transferring plate formed of a metallic material having a high thermal conductivity and a plane structure thermoelectric module which may be installed under the heat transferring plate to cool the solid-state sensors. Further, a cooling unit to cool heat generated in the heat transferring unit may be provided under the heat transferring unit. The cooling unit may adopt a water cooling method or an air cooling method.

A ceramic board can be attached under the solid-state sensor. A cooling tip formed of a ceramic material may be installed under the ceramic board to make up an integral unit comprising the solid-state sensor, the ceramic board, and the cooling tip, wherein the cooling tip may be in contact with the heat transferring unit through the motherboard. The length of the cooling tip may be longer than the thickness of the motherboard.

Further, the radiation detector may be provided in the housing made of aluminum having a high thermal conductivity to provide an excellent cooling efficiency. The radiation detector can comprise a thermoelectric module, wherein one side is cooled and the other side is heated, and a cooling unit under the thermoelectric module to cool the heat generated in the thermoelectric module. Where the housing is located at an upper surface of the cooling unit, an internal end of the housing may be in contact with the thermoelectric module. The housing may also include a fastener having a high thermal conductivity to fix the housing and the cooling unit into a single unit. Where the housing is connected with the thermoelectric module, it may be installed such that it is connected only with the side of the thermoelectric module that emits heat.

As described above, the radiation detector of the present invention provides an excellent cooling effect which can improve a signal to noise ratio, wherein the solid-state sensors that are used to collect photons generated during conversion of radiation to light are combined through the holes formed on the motherboard, such that the solid-state sensors are in direct contact with the plane structure of thermoelectric modules for efficient cooling. Also, as mentioned above, in the radiation detector, heat generated at one side of the thermoelectric modules is transmitted through a housing formed of aluminum having a high thermal conductivity to maintain an appropriate temperature required by the semiconductor apparatus. Further, moisture and condensation formed on the radiation detector are removed, resulting in economical advantages by extending the life-span and improving the stability of the semiconductor apparatus.

To explain the invention in detail the exemplary embodiments of the present invention are provided, referring to the attached drawings.

Referring to FIGS. 1-4, a radiation detector (100) having excellent cooling efficiency, according to an embodiment of the present invention, comprises a detection unit (200) which can detect incident radiation from an outside radiation source (not shown), a heat transferring unit (400), which can cool the heat generated in the detection unit (200), and a quadrilateral shape housing (110), wherein the detection unit (200) and the heat transferring unit (400) are provided. The radiation detector (100) further comprises a cooling unit (600) to cool heat generated in the heat transferring unit (400), wherein the cooling unit (600) is provide under the housing (110).

The detection unit (200) comprises a collimator (210). The detection unit (200) further comprises a scintillator (310) and a photon transferring plate (320) which are provided under the collimator (210) and are covered with a cover (330) made of a material having a high thermal conductivity, such as copper or aluminum. Further, solid-state sensors (370) which are installed on a motherboard (350) is provided under the photon transferring plate (320), or under the cover (330), to detect radiation.

Figure 1:
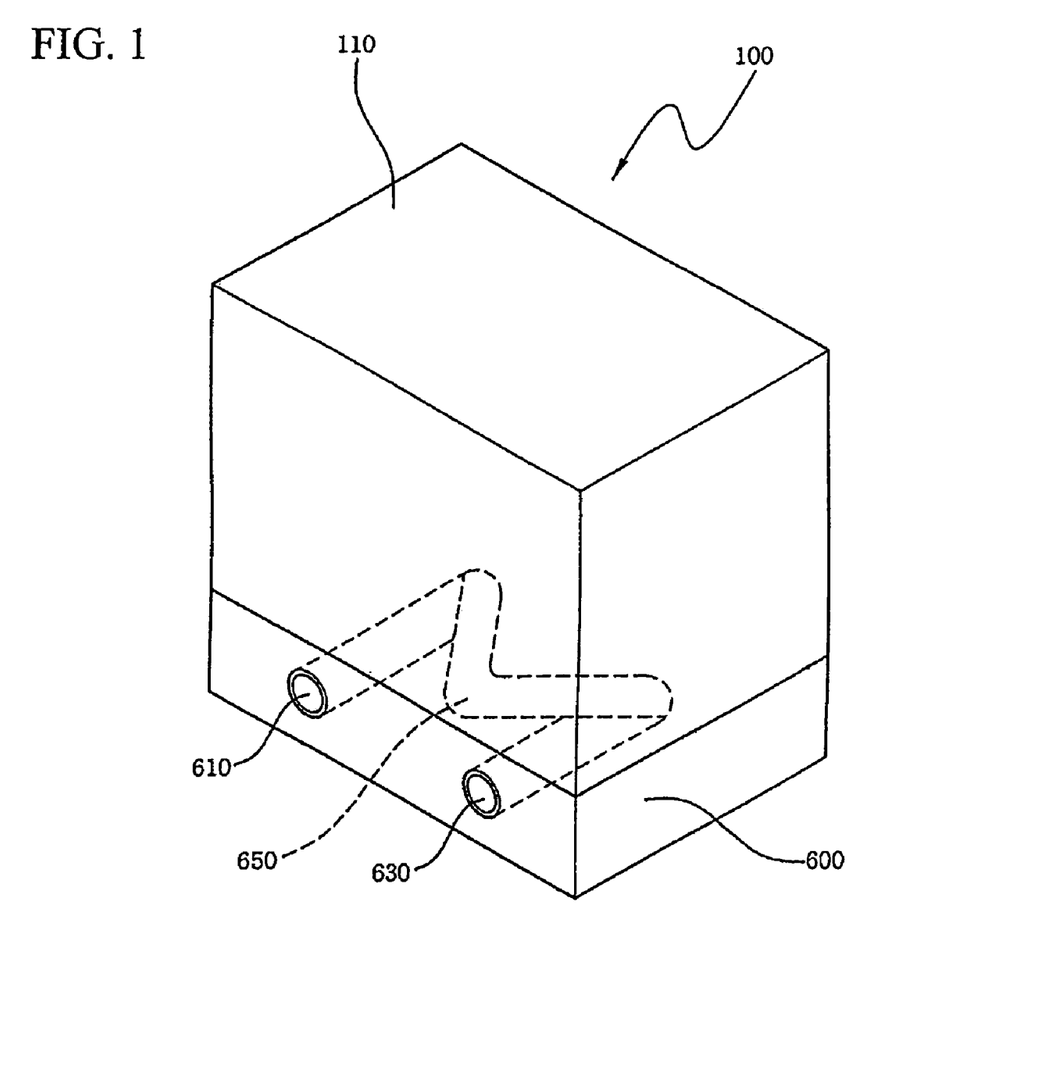
FIG. 1 is a skew drawing of a radiation detector having an excellent cooling effect according to an embodiment of this invention.
Figure 2:
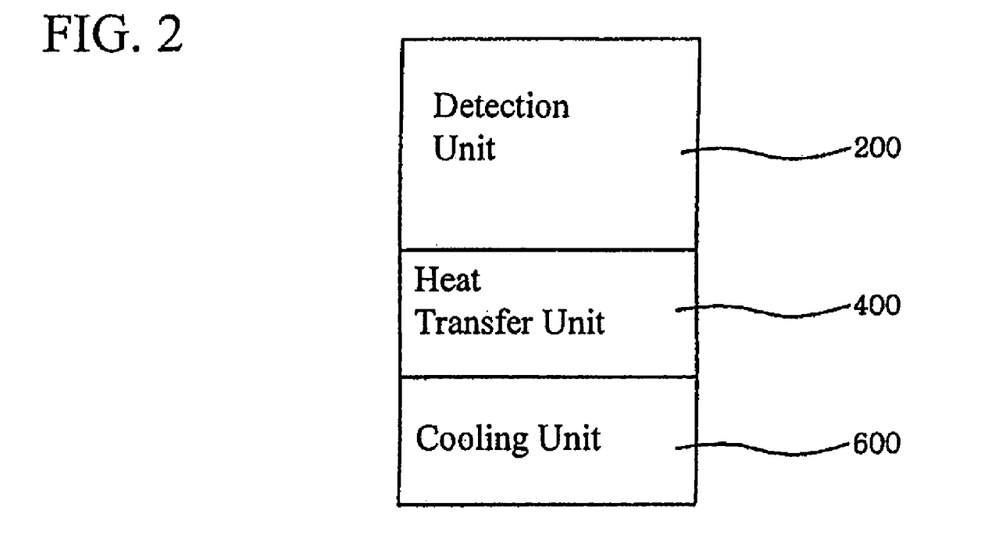
FIG. 2 is a block drawing of the radiation detector having an excellent cooling effect according to an embodiment of this invention.
Figure 3:
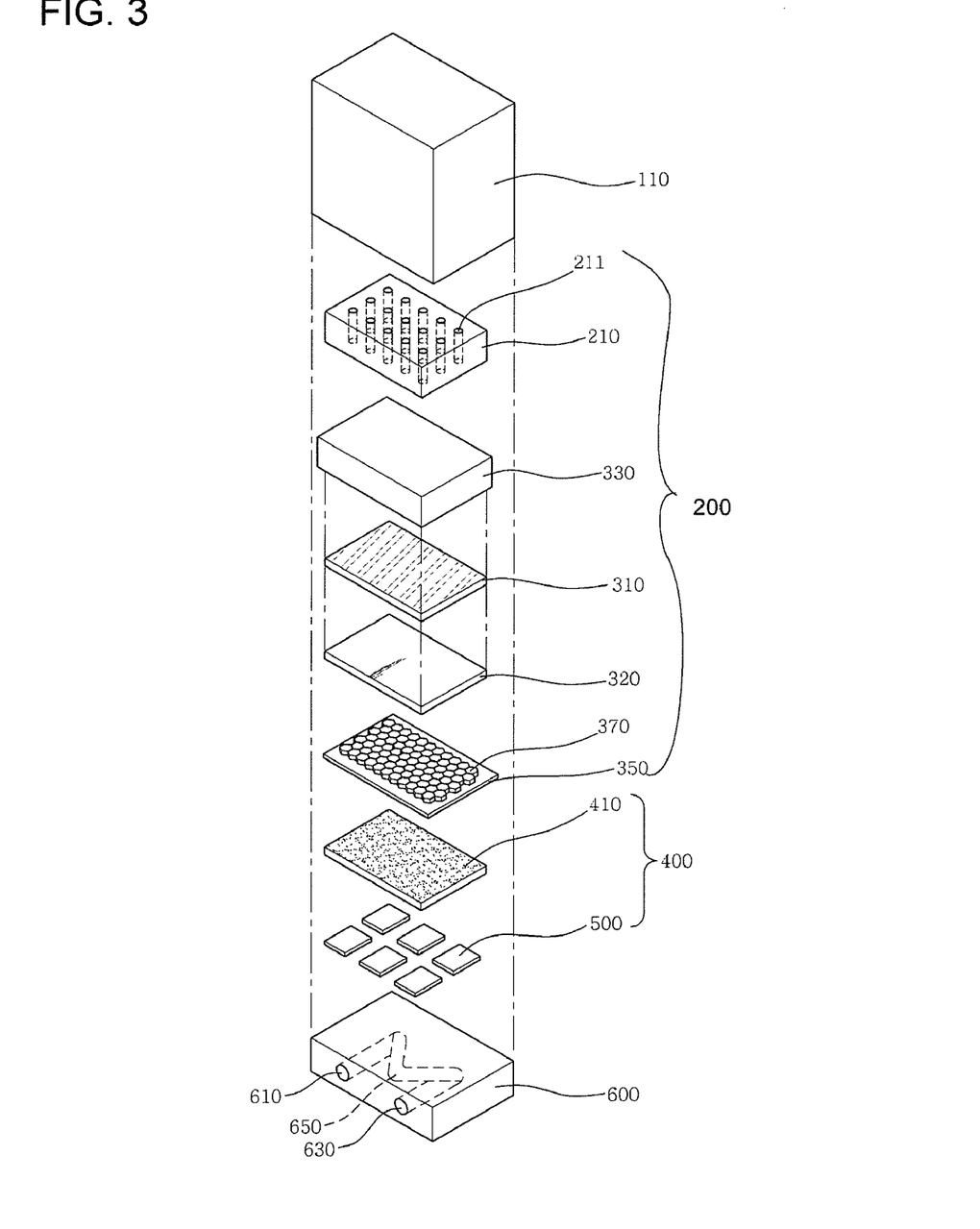
FIG. 3 is an exploded skew drawing of the radiation detector having an excellent cooling effect according to an embodiment of this invention.
Figure 4:
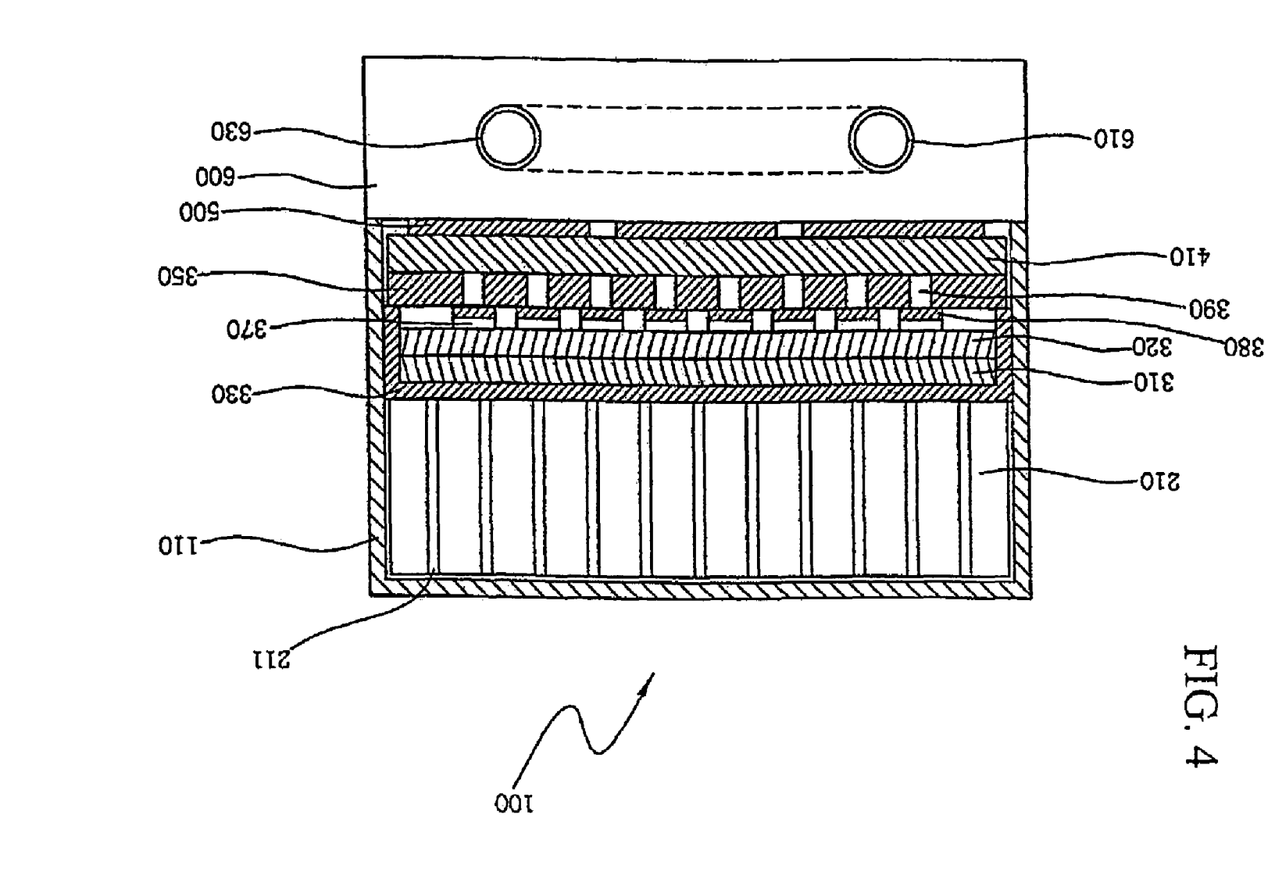
FIG. 4 is a front cross sectional drawing of the radiation detector of FIG. 1.

As shown, the collimator (210) has a rectangular parallel piped shape and is made of a radiation blocking material to make the range and direction of radiation clear. Preferably, the collimator (210) is formed of a lead (Pb) and bismuth (Bi) alloy. The collimator (210) has a plurality of passage holes (211) extending from its upper surface to its lower surface. Such configuration of collimator (210) allows only straight radiation that passes through the holes (211) to enter into the radiation detector (100) among radiations of various directions dispersed from a radiation source, such as gamma rays or X-rays.

The scintillator (310) is provided under the collimator (210) and converts the radiation entering through the collimator (210) to visible light, thereby dispersing photons. The photon transferring plate (320) located under the scintillator (310) is configured to have the same width and depth as those of the scintillator (310). In this embodiment, a crystal is used to form the scintillator (310) and the photon transferring plate (320) is made of a glass. Since the crystal which is used to form the scintillator (310) is susceptible to moisture, the scintillator (310) is placed within a cover (330). Also, the photon transferring plate (320) hermetically seals the cover (330) to prevent penetration of moisture into the cover (330), and allows the radiation dispersing through the scintillator (330) to pass.

Figure 5:
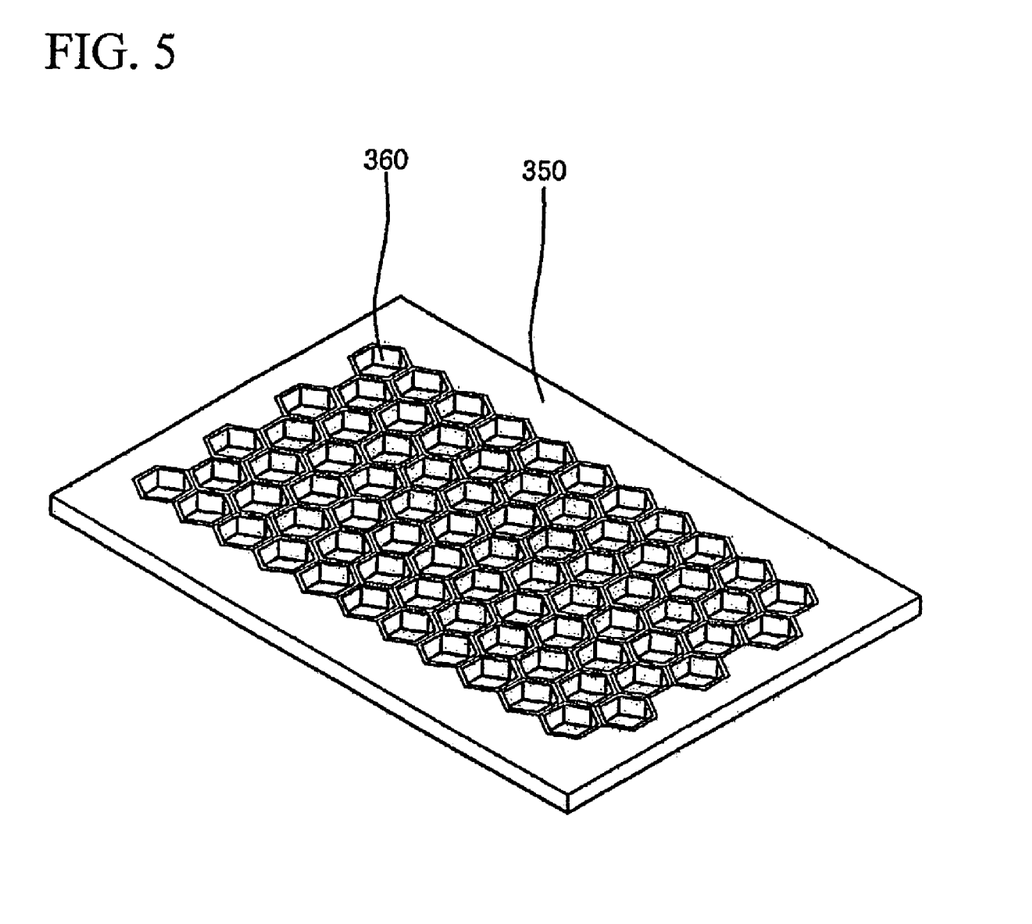
FIG. 5 is a skew drawing showing a motherboard used in an embodiment of this invention.
Figure 6:
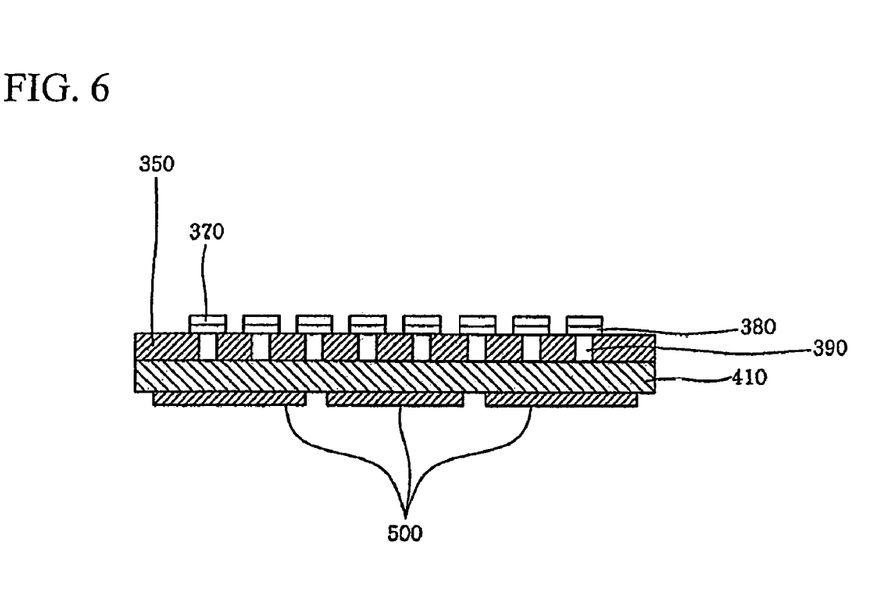
FIG. 6 is a front cross sectional drawing showing a solid-state sensor mounted on the motherboard according to an embodiment of this invention.

Referring to FIGS. 3, 5, 6, the solid-state sensors (370) are mounted on the motherboard (350), which is a PCB plate, and provided below the photon transferring plate (320), or below the cover (330). The solid-state sensors (370) are configured to collect photons entering through the scintillator (310) and converts them to electric signals such that radiation may be detected. In one embodiment, SDDs (silicon drift diodes) is used as the solid-state sensors (370) and a plurality of hexagonal insertion holes (360) are formed on the motherboard (350).

Here, it is desirable to attach a ceramic board (380) formed of a ceramic material that is a PCB plate for a sensor carrier board to the bottom of the solid-state sensors (370), and to form the cooling tips (390) on the bottom of the ceramic board (380), such that the solid-state sensors (370), the ceramic board (380), and the cooling tips (390) form an integral unit. Here, it is also desirable that the cooling tips (390) are made of a ceramic material because they are formed on the ceramic board (380) made of a ceramic material. Also, the ceramic board (380) and the cooling tips (390), which are made of a ceramic material, have excellent abrasion resistance, durability, thermal conductivity, and thermal radiation properties. Therefore, because the heat moving between the solid-state sensors (370) and the cooling tips passes through the ceramic board (380), a sudden heat transfer between the solid-state sensors (370) and the cooling tips may be prevented, and, as a result, the ceramic board (380) also functions to protect the solid-state sensors (370). Although, the ceramic board (380) is used as the sensor carrier board in this embodiment, PCBs formed of various materials such as FR-3, CEM-1, CEM-3, FR-4, FR-5, and GI may be also used.

The cooling tips (390) formed on the ceramic board (380) are inserted through the insertion halls (360) of the motherboard (350) such that the ceramic board (380) which is assembled with the solid-state sensors (370) is mounted on the motherboard (350). Here, it is desirable to form the cooling tips (390) to have a length which is longer than the thickness of the motherboard (350). That is, when the ceramic board (380) assembled with the solid-state sensors (370) is installed on the upper surface of the motherboard (350), some of the cooling tips (390) project through the lower surface of the motherboard (350). Moreover, the solid-state sensors (370) are electrically connected to the ceramic board (380), and the ceramic board (380) is electrically connected to the motherboard (350). As such, photons detected by the solid-state sensors (370) can be converted into electric signals and radiation can be detected by a separate signal processing apparatus.

Furthermore, a heat transferring unit (400) is provided under the motherboard (350). The heat transferring unit (400) has a heat transferring plate (410) made of a metallic material having a high thermal conductivity, such as copper or aluminum. A plurality of thermoelectric modules (420) having a plane structure is provided under the heat transferring plate (410) to cool the solid-state sensors (370). Here, it is desirable that the upper surface of the heat transferring plate (410) is in contact with the cooling tips (390) formed on the ceramic board (380), and the lower surface of the heat transferring plate (410) is in contact with the thermoelectric modules (420).

In this invention, Peltier modules which utilizes a Peltier effect were used as thermoelectric modules (420). The Peltier effect is a phenomenon wherein heat is transferred by movement of electric potential when two different metals are attached together via two contact points and electric potential difference is formed at both ends of these two metals. In summarizing this phenomenon, free electrons, which are mobilized by electromotive force, move by absorbing the most easily-obtained heat energy in a situation where they are required to absorb energy to move to a higher Fermi level, such the side donating electrons continuously absorbs heat and the other side continuously radiates heat. As the thermoelectric module (420) is configured with an electric circuit that is simply structured and environment friendly, which does not have any physical moving structures, it may provide almost a trouble-free system with a high reliability.

According to this embodiment, one side of the thermoelectric modules (420) which absorbs heat is directed to the solid-state sensors (370), and the other side that radiates heat is directed opposite from the solid-state sensors (370). Therefore, as the upper surface of the heat transferring plate (410) is in contact with the cooling tips (390) formed on the ceramic board (380), the heat transferring plate (410) loses heat by the heat absorption action of the thermoelectric modules (420) and the cooling tips (390) contacted with the heat transferring plate (410) also lose heat.

Through this mechanism, the cooling tips (390), and thus, the solid-state sensors (370) attached to the ceramic board (380), are cooled through the heat transferring plate (410). As a result, solid-state sensors (370) are efficiently cooled to improve the signal-to-noise ratio (S/N), and thus, the radiation detection performance of radiation detector is improved.

Further, since the thermoelectric modules (420) have a plane structure, and the heat transferring plate (410) is in contact with the plurality of cooling tips (390) formed on the ceramic board (380), temperature of the plurality of solid-state sensors (370) can be controlled simultaneously through the thermoelectric modules (420). That is, when a temperature changes in the thermoelectric modules (420), the temperature of the heat transferring plate (410), which is in contact with the thermoelectric modules (420), also changes, and thus, the temperature of all of the plurality of cooling tips (390), which are in contact with the heat transferring plate (410), and ceramic board (380) change simultaneously. Therefore, the temperature of the plurality of solid-state sensors (370) can be controlled simultaneously.

In addition, for smooth heat transmission at a contacting surface between the thermoelectric modules (420) and the heat transferring plate (410), and at a contacting surface between the heat transferring plate (410) and the cooling tips (390), a heat transmission material (not shown) may be applied. The heat transmission material is a kind of heat transmission medium applied between two contacting surfaces to avoid loss of heat flow, and may include, but not limited to, heat conductive grease and heat radiant compounds.

Figure 7:
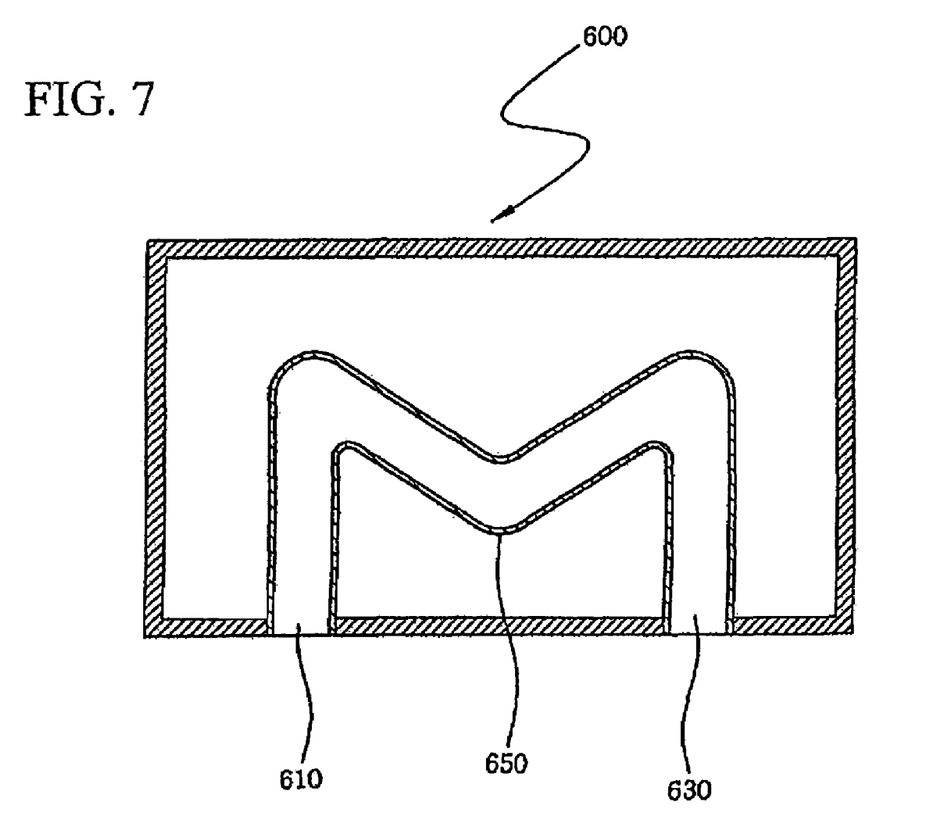
FIG. 7 is a top plane drawing of a cooling unit according to an embodiment of this invention.

Now referring to FIG. 7, the cooling unit (600) adopts a water-cooling method using heat-radiation water. The cooling unit (600) comprises a water supply hole (610) for inflow of heat-radiation water and a water drain hole (630) to drain heat-radiation water. Further, a water pipe (650) is provided in the cooling unit (600) to connect the water supply hole (610) and water drain hole (630).

As discussed previously, one side of the thermoelectric modules (420) produces the cooling effect through heat-absorption action, while heat is generated on the other side of the thermoelectric modules (420), which is also the bottom side of the housing (110). Therefore, the temperature of the heat-radiation water supplied into the water pipe (650) through the water supply hole (610) rises as the heat-radiation water absorbs the heat generated from the heat generating side of the thermoelectric modules (420). The heat-radiation water with an elevated temperature is then circulated to outside through the water drain hole (630). Once the temperature of the heat-radiation water drops, the heat-radiation water flows back through the water supply hole (610). Further, some of heat generated at the heat generating side of the thermoelectric modules (420) may be transmitted to the housing (110). Although the cooling unit (600) of this invention is expressed with a water-cooling method, an air-cooling method may also be used with installation of one or multiple fans (not shown) at the cooling unit (600).

Figure 8:
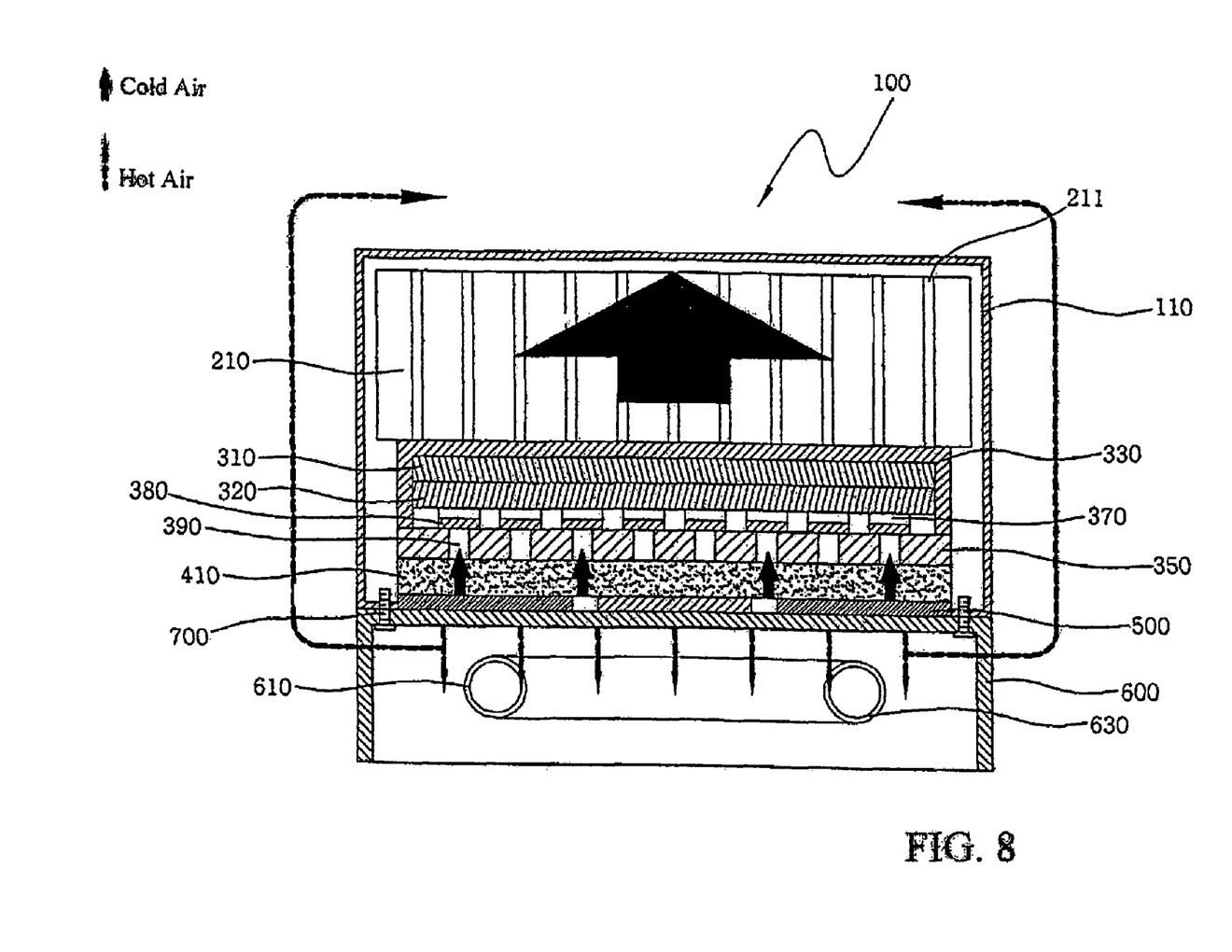
FIG. 8 is a front cross sectional drawing showing heat movement of the radiation detector according to an embodiment of this invention.

Referring to FIG. 8, the housing (110) forms the outer shape of the radiation detector. The housing (110) is provided such that the bottom of the housing (110) sits on the upper surface of the cooling unit (600). The housing (110) may be installed such that it is separated from the cooling unit (600) with a certain distance to avoid direct transmission of heat cooled from the cooling unit (600) to the housing (110). Further, it is desirable when the housing (110) is installed above the cooling unit (600), the internal end of the housing (110) is in contact with the thermoelectric modules (420). That is, the housing (110) may be installed so that the internal end of the housing (110) is in contact with the heat generating side of the thermoelectric modules (420) such that the heat generated from the thermoelectric modules (420) can transfer to the housing (110) directly. Therefore, it is desirable to use a material having a high thermal conductivity, such as copper or aluminum, to form the housing (110).

Further, the housing (110) comprises a fastener (700), such as bolts and screws, to fix the housing (110) and the cooling unit (600) into a single unit when the housing (110) is mounted on the cooling unit (600). Therefore, fastening holes are provided on the inside of the housing (110) and the upper side of the cooling unit (600) to fasten the fastener (700). Preferably, the fastener (700) is made of a metallic material having a high thermal conductivity, such as copper or aluminum. As such, some of the heat generated from the heat generating side of the thermoelectric modules (420) is transferred to the housing (110), thereby elevating the temperature of the housing (110) to prevent formation of moisture and condensation during operation of the radiation detector (100) which can avoid any error that may be caused by moisture and condensation.

The radiation detector (100) configured according to this embodiment, allows radiation irradiated from a radiation source, such as gamma ray and X-ray, to enter the radiation detector (100) through the collimator (210). The straight radiation entering through the holes of the collimator (210) is changed to visible light by the interaction with the scintillator (310) while passing through the scintillator (310) and are dispersed as photons. The photons reach the solid-state sensors (370) through the photon transferring plate (320) and the photons detected by the solid-state sensors (370) are changed into electrical signals.

At this time, heat is generated from the solid-state sensors (370) as the radiation detector (100) operates. The solid-state sensors (370) show the best detection efficiency when the temperature is in the range of between −15° C. to −20° C. That is, when the temperature is in the range of between −15° C.~−20° C., the signal-to-noise ratio is improved, and thus, the performance of radiation detector (100) is improved. Therefore, the solid-state sensors (370) are cooled to −15° C.~−20° C. by the cold air generated at the heat absorbing side of the thermoelectric modules (420) while the heat generated at the heat generating side of the thermoelectric modules (420) is cooled by the cooling unit (600) installed under the thermoelectric modules (420). Also, some of the heat generated at the heat generating side of the thermoelectric modules (420) is transmitted to the housing (110), thereby, elevating the temperature of the housing (110) to prevent error which may be caused by moisture or condensation during operation of radiation detector (100).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A radiation detector having an excellent cooling effect comprising:
   a detection unit comprising a plurality of solid-state sensors assembled on a motherboard to detect photons generated by conversion of a radiation irradiated from a radiation source into a light;
   a heat transferring unit provided under the detection unit, cooling the plurality of solid-state sensors simultaneously;
   a housing wherein the detection unit and the heat transferring unit are provided; and
   wherein a ceramic board is attached under the plurality of solid-state sensors and a ceramic cooling tip is formed under the ceramic board such that the plurality of solid-state sensors, the ceramic board, and the cooling tip form an integral unit, wherein and the cooling tip is in contact with the heat transferring unit through the motherboard.

2. The radiation detector having an excellent cooling effect of claim 1, wherein the heat transferring unit comprises:
   a heat transferring plate formed of a metallic material having a high thermal conductivity; and
   plane structure thermoelectric modules provided under the heat transferring plate to cool the plurality of solid-state sensors.

3. The radiation detector having an excellent cooling effect of claim 2 further comprising a cooling unit provided under the heat transferring unit to cool heat generated in the heat transferring unit.

4. The radiation detector having an excellent cooling effect of claim 3, wherein the cooling unit is an air-cooling unit.

5. The radiation detector having an excellent cooling effect of claim 3, wherein the cooling unit a water-cooling unit.

6. The radiation detector having an excellent cooling effect of claim 1, wherein the length of the cooling tip is longer than the thickness of the motherboard.

7. The radiation detector having an excellent cooling effect of claim 1, wherein the housing has a high thermal conductivity to transfer heat generated at one side of the thermoelectric modules to the outside, wherein moisture and condensation formed on the outside of the radiation detector are removed as the heat is transferred to the outside through the housing.

8. The radiation detector having an excellent cooling effect of claim 7, wherein the housing is formed of aluminum having a high thermal conductivity; and the thermoelectric modules are cooled on one side and heated on the other side, wherein the thermoelectric modules are provided in the housing; wherein the cooling unit cools heat generated in the thermoelectric modules.

9. The radiation detector having an excellent cooling effect of claim 8, wherein the housing is mounted on the cooling unit, wherein an internal end of the housing is in contact with the thermoelectric modules.

10. The radiation detector having an excellent cooling effect of claim 9, wherein the housing is provided such that only one side of the thermoelectric modules which radiates heat is in contact with the housing.

11. The radiation detector having an excellent cooling effect of claim 8, wherein the housing includes a fastener having a high thermal conductivity to fix the housing and the cooling unit into a single unit.

* * * * *